United States Patent
Uchiyama (10) Patent No.: US 6,900,843 B1
(45) Date of Patent: May 31, 2005

(54) ELECTRONIC CAMERA HAVING CONDUCTIVE ELASTIC BODY PROVIDED FOR SHIELD PLATE

(75) Inventor: Takayuki Uchiyama, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/501,663

(22) Filed: Feb. 10, 2000

(30) Foreign Application Priority Data

Aug. 16, 1999 (JP) .......................................... 11-229816

(51) Int. Cl.⁷ .......................................... H04N 5/225
(52) U.S. Cl. .................................................... 348/374
(58) Field of Search ............................... 348/373, 374, 348/375, 340, 207.99; 174/35 R, 35 SM; 438/64, 59, 60; 257/294; 361/816, 818

(56) References Cited

U.S. PATENT DOCUMENTS

| | | | | |
|---|---|---|---|---|
| 5,142,137 A | * | 8/1992 | Kushino et al. | 250/208.1 |
| 5,847,938 A | * | 12/1998 | Gammon | 361/816 |
| 5,952,714 A | * | 9/1999 | Sano et al. | 257/680 |
| 6,018,461 A | * | 1/2000 | Biermann et al. | 361/737 |
| 6,156,587 A | * | 12/2000 | Kayanuma et al. | 438/106 |
| 6,239,359 B1 | * | 5/2001 | Lilienthal et al. | 174/35 GC |
| 6,249,653 B1 | * | 6/2001 | Itoh et al. | 396/535 |
| 6,381,124 B1 | * | 4/2002 | Whitcher et al. | 361/681 |
| 6,403,964 B1 | * | 6/2002 | Kyyhkynen | 250/370.09 |
| 6,420,649 B1 | * | 7/2002 | Kahl et al. | 174/35 R |
| 6,485,595 B1 | * | 11/2002 | Yenni et al. | 156/221 |
| 6,496,285 B1 | * | 12/2002 | Fujimoto et al. | 358/475 |

FOREIGN PATENT DOCUMENTS

| | | | | | |
|---|---|---|---|---|---|
| JP | 60000166 A | * | 1/1985 | | H04N/5/225 |
| JP | 62050809 A | * | 3/1987 | | G02B/23/24 |
| JP | 02071678 A | * | 3/1990 | | H04N/5/225 |

* cited by examiner

Primary Examiner—Wendy R. Garber
Assistant Examiner—Justin Misleh
(74) Attorney, Agent, or Firm—Oliff & Berridge PLC (57) ABSTRACT

An image-capturing element that receives subject image light entering into a camera body through a taking lens is packaged and mounted within the camera body via a holder. The image-capturing element is mounted at the camera body by ensuring that its light-receiving surface is aligned with the image-forming position of the taking lens. A shield plate is provided on the rear side of the image-capturing element and a conductive elastic body is clamped and pressed between the shield plate and the rear portion of the camera body. The shield plate is grounded to the camera body having a large grounding capacity by the conductive elastic body. The conductive elastic body covers a gap at the periphery of the shield plate to absorb and block the electromagnetic wave noise which would otherwise leak through the gap.

14 Claims, 6 Drawing Sheets

ELECTRONIC CAMERA HAVING CONDUCTIVE ELASTIC BODY PROVIDED FOR SHIELD PLATE

INCORPORATION BY REFERENCE

The disclosures of the following applications are herein incorporated by reference:

Japanese Patent Application No. 10-67019 filed Mar. 17, 1998

Japanese Patent Application No. 11-229816 filed Aug. 16, 1999

BACKGROUND OF THE INVENTION

1. Field of the Invention

The present invention relates to a technology that may be adopted to prevent electromagnetic noise leak in an electronic camera having an image-capturing element that receives subject image light entering into the camera body via a taking lens and is mounted in the camera body via a holder that holds the image-capturing element.

2. Description of the Related Art

In recent years, mega-pixel electronic still cameras provided with an image-capturing element (hereafter referred to as a CCD) with more than a million pixels have been put into practical use. A CCD reads out voltages stored at the individual pixels in units of single lines in response to a read signal having a specific clock rate. As the clock rate achieves a higher frequency or as the level of the voltages read by the CCD rises, the level of electromagnetic noise generated at the CCD and/or its drive circuit increases.

In the prior art, a metal shield plate is provided between a CCD drive circuit board located at the rear surface of the CCD and the associated inside surface of the camera body to attenuate the electromagnetic noise generated at the CCD and/or the drive circuit so that the noise does not leak from the camera body to the outside.

However, in an electronic still camera mounted with a CCD having dimensions of 23.7 mm (height)×15.6 mm (width) with the number of its pixels exceeding 2,500,000, the level of electromagnetic noise leaking from the camera body cannot always be reduced to a specific level or lower simply by providing a shield plate between the CCD drive circuit board and the camera body, as in the prior art. In other words, in such a large scale CCD, a relatively high voltage is used to ensure that the signal waveform corresponding to each pixel does not become blunted during a read. This, combined with a higher frequency of the read clock achieved to support a large number of pixels, raises the level of the electromagnetic noise.

SUMMARY OF THE INVENTION

An object of the present invention is to provide an electronic camera in which leak of electromagnetic noise generated at a circuit board for image-capturing element drive is prevented with a higher degree of effectiveness.

The present invention achieves the object described above by constituting an electronic camera with an image-capturing element that receives subject image light entering into the camera body through a taking lens, a holder that holds the image-capturing element to mount it in the camera body, a circuit board mounted with a circuit that drives the image-capturing element, a shield plate provided so as to cover the circuit board and a conductive elastic body that is clamped between and becomes deformed by the shield plate and a conductive portion having a large grounding capacity.

If the camera body constitutes the conductive portion having a large grounding capacity, the conductive elastic body becomes clamped and pressed between the shield plate and the camera body. If the shield plate is constituted of a first shield plate having an opening to allow wiring from the circuit board to be drawn around, which is provided to cover the circuit, and a second shield plate that covers the first shield plate so as to cover the wiring opening as well, the conductive elastic body is clamped and pressed between the first and second shield plates and the conductive portion constituted of the camera body. In this case, it is desirable to improve the shielding effect by deforming the second shield plate to place it in contact with the first shield plate.

The present invention is particularly suited for application in electronic cameras with the shield plates provided at varying positions within the camera bodies among individual camera units. For instance, it is ideal for application in an electronic camera having a body-side mounting surface of the camera body at which the holder is mounted machined to achieve a specific distance from the image-forming plane and a holder-side attaching surface of the holder which is attached to the body-side mounting surface machined to achieve a specific distance from the light-receiving surface of the image-capturing element to ensure that the light-receiving surface of the image-capturing element is aligned with the image-forming plane when the holder is mounted at the camera body. In this type of electronic camera, the light-receiving surface is aligned with the image-forming plane simply by placing the holder-side attaching surface in contact with the camera-side mounting surface to mount the holder. Thus, no adjustment to align the light-receiving surface with the image-forming plane is required in individual camera units.

It is desirable that the shield plate have a sufficient degree of strength to assure that it is not unduely deformed by the pressure manifesting as a result of the deformation of the conductive elastic body. For instance, the shield plate may be formed of a metal sheet. The conductive elastic body is provided so as to fill the gap formed between the shield plate and the circuit board at the periphery of the shield plate.

In an electronic camera with its camera body constituted of a front cover and a rear cover and a gap formed at the area where the front cover and the rear cover are joined, the gap at the joining area is shielded from the circuit board by the conductive elastic body.

DETAILED DESCRIPTION OF THE PREFERRED EMBODIMENTS

First Embodiment

Figure 1:
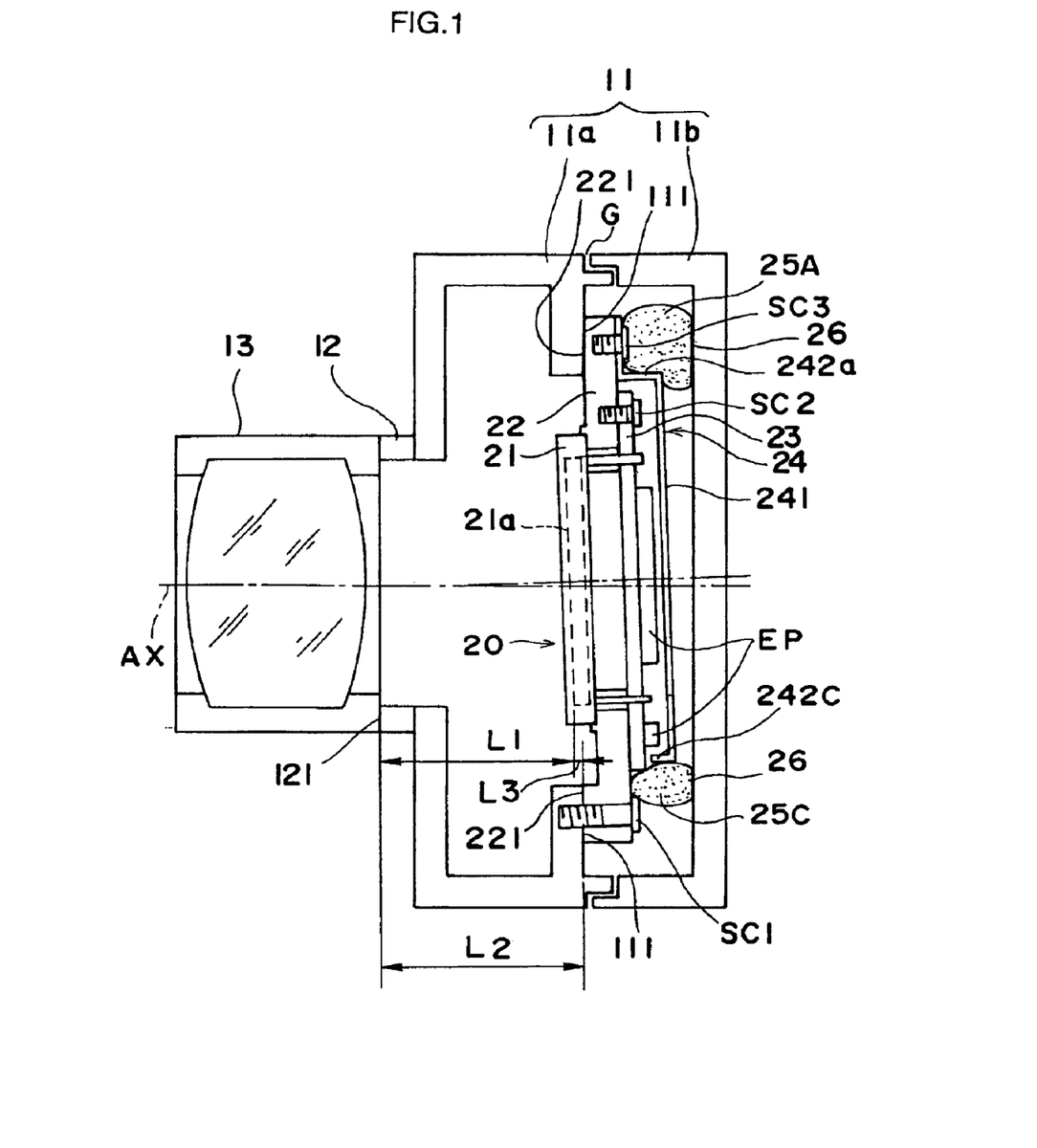
FIG. 1 is a longitudinal vertical cross sectional view schematically illustrating a first embodiment of the electronic still camera according to the present invention.
Figure 3:
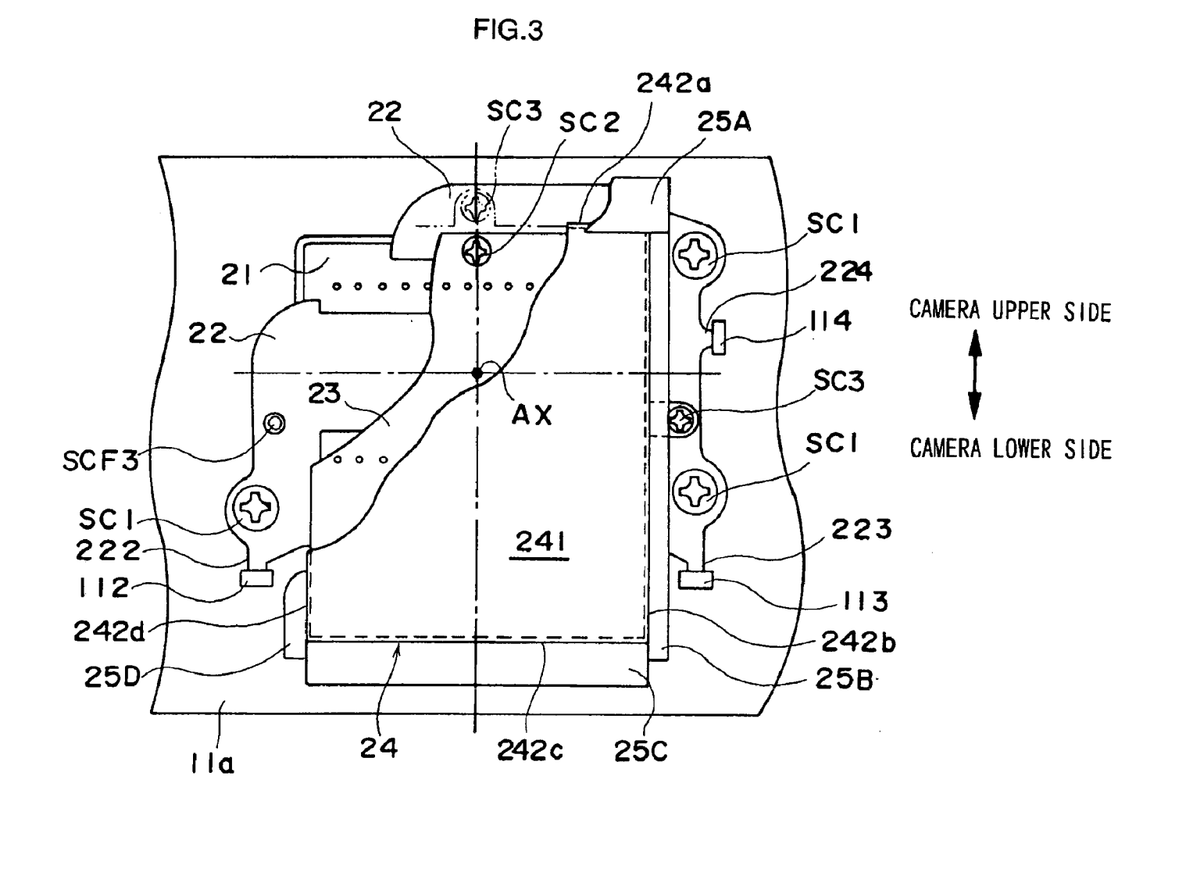
FIG. 3 shows the image-capturing device viewed from the rear side of the camera with the camera rear body shown in FIG. 1 being removed.

FIG. 1 is a longitudinal vertical cross sectional view illustrating a schematic structure of the electronic camera according to the present invention constituted as a lens-exchange type electronic still camera and FIG. 3 shows the inside of the camera as viewed from the rear with the rear body being removed. As illustrated in FIG. 1, a camera body 11 is constituted of a front body 11a and a rear body 11b formed from a conductive metal material, and a slight gap G is formed between the front body 11a and the rear body 11b. According to the present invention, the electromagnetic wave noise leaking through this gap G is effectively minimized.

A lens mount 12 is provided at the camera front body 11a, with an exchangeable taking lens 13 mounted on the lens mount 12. Subject light having passed through the taking lens 13 enters an image-capturing device 20. The image-capturing device 20 comprises a solid image-capturing element 21 such as a CCD having dimensions of 23.7 mm (height)×15.6 mm (width) with the number of pixels amounting to 2,600,000. The image-capturing element 21 is pre-packaged by using ceramic or the like, and a holder 22 is provided as an integrated part of the package. The image-capturing device 20 is fastened to the camera body 11 by means of screws SC1 with attaching surface 221 of the holder 22 being in contact with a mounting surface 111 of the camera front body 11a.

At the side of the holder 22 toward the camera body rear surface, i.e., toward the rear body 11b, a circuit board 23 mounted with elements EP such as a circuit that drives the image-capturing element 21 is mounted by means of screws SC2. At the side of the circuit board 23 toward the rear body 11b, a shield plate 24 is attached to the holder 22 by means of screws SC3. The shield plate 24 includes a flat portion 241 and bent portions 242a–242d formed by bending the four sides of the flat portion 241. The shield plate 24, which is grounded to the holder 22 via the screws SC3, is provided to absorb and attenuate the electromagnetic wave noise generated at the image-capturing element drive circuit to prevent it from leaking to the outside from the camera body 11. Gaskets 25A–25D constituted of a conductive elastic material are clamped and held between the shield plate 24 and the rear body 11b. Gaskets 25 are bonded to the rear body 11b with double-sided adhesive tape 26.

Figure 2:
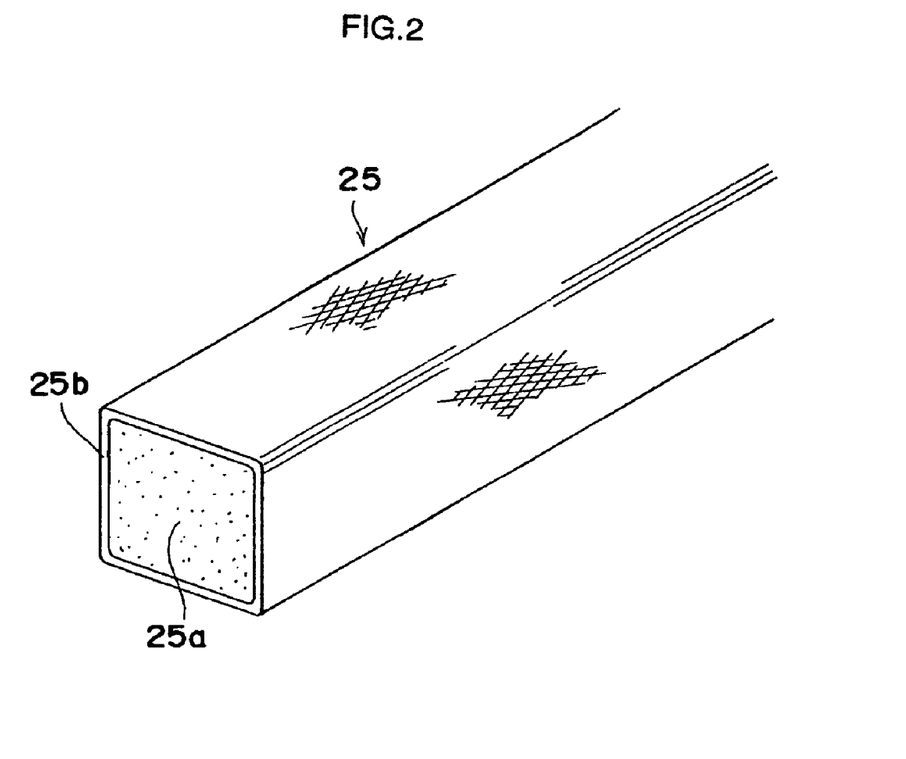
FIG. 2 is a perspective view of a gasket shown in FIG. 1.

As illustrated in FIG. 2, the gaskets 25 are constituted by covering a sponge rod 25a with a conductive woven cloth 25b. Thus, when the gaskets 25 are clamped and pressed between the rear body 11b and the shield plate 24, it becomes deformed in conformance with the shape of the shield plate 24 or the like, as illustrated in FIG. 1. The gaskets 25A–25D are each provided at one of the four sides of the shield plate 24 as illustrated in FIG. 3 to suppress leak of the electromagnetic wave noise which would otherwise leak sideways through the gap between the shield plate 24 and the circuit board 23. The elasticity of the gaskets 25 is used to allow for varying positions that the image-capturing device 20 may take among individual camera units when a light-receiving surface 21a of the CCD 21 is aligned with the image-forming plane of the taking lens 13.

Next, the method employed to align the light-receiving surface 21a of the CCD 21 with the image-forming plane of the taking lens 13 is explained. In an exchangeable lens type electronic still camera, it is necessary to align the light-receiving surface 21a with the image-forming plane of the taking lens 13 by establishing a specific distance L1 between a lens mount surface 121 of the lens mount 12 and the light-receiving surface 21a of the image-capturing element 21 with a specific degree of accuracy. Thus, in the embodiment, a camera-side mounting surface 111 is machined relative to the lens mount surface 121, i.e., relative to the image-forming plane of the taking lens 13 to ensure that a specific distance L2 is established between the lens mount surface 121 formed at the lens mount 12 and the camera-side mounting surface 111 of the camera body 11.

At the same time, an attaching surface 221 of the holder 22 is machined relative to the light-receiving surface 21a of the image-capturing element 21 to establish a specific distance L3 between the light-receiving surface 21a of the image-capturing element 21 and the holder-side attaching surface 221 of the holder 22. As a result, when the image-capturing device 20 is mounted onto the camera body 11 with the screws SC1, the specific distance L1 is achieved between the lens mount surface 121 of the lens mount 12 and the light-receiving surface 21a of the image-capturing element 21 with a specific degree of accuracy. In other words, through the machining process performed to establish the distance L2 on the camera body side and the distance L3 on the image-capturing device side with a high degree of accuracy, it is ensured that L2−L3=L1 to align the light-receiving surface 21a with the image-forming plane of the taking lens 13.

In FIG. 3, two positioning tangs 222 and 223 projecting downward and one positioning tang 224 projecting laterally are formed at the holder 22 of the image-capturing device 20. At the camera body 11, positioning projections 112–114 are provided on the rear surface of the front body 11a along the optical axis AX. Lower positioning surfaces are formed at the top surfaces (located toward the upper side in the figure), of the positioning projections 112 and 113, and a lateral positioning surface is formed at a side surface (located toward the left side in the figure) of the positioning is projection 114. The lower surfaces (located toward the lower side in the figure) of the two positioning tangs 222 and 223 are respectively placed in contact with the top surfaces (toward the upper side in the figure) of the positioning projections 112 and 113 of the camera body 11, and a side surface (toward the right side in the figure) of the single positioning tang 224 projecting laterally with respect to the holder 22 is placed in contact with the lateral positioning surface of the positioning projection 114 of the camera body 11, to position the image-capturing element 21 with respect to the axis.

Since a method of machining the holder-side attaching surface 221 and the positioning surfaces of the positioning pieces 222–224 at the image-capturing device 20 is described in detail in the specification of Japanese Patent Application No. Heisei 10-67019 filed by the same applicant of the present invention, only a brief explanation is given herein below of the method.

With respect to the camera body 11a, the camera-side mounting surface 111 is machined so as to achieve the distance L2 from the reference surface, i.e., the lens mount surface 121 of the taking lens 13. With respect to the image-capturing element 21, the holder-side attaching surface 221 of the holder 22 is machined so as to achieve the distance L3 from the reference surface, i.e., the light-receiving surface 21a. The image-capturing element 21 is mounted at the camera body 11 so that the camera-side mounting surface 111 and the holder-side attaching surface 221 are in contact with each other. By adopting this structure, the light-receiving surface 21a of the image-capturing element 21 can be aligned with the image-forming position of the taking lens 13 without requiring a positioning mechanism for setting the position of the image-capturing element 21. In addition, when the image-capturing device 20 has been detached for maintenance after shipment, it can be re-mounted onto the camera body by simply placing the camera-side mounting surface 111 and the holder-side attaching surface 212 in contact with each other, thereby eliminating the need to implement a positional adjustment process to align the light-receiving surface 21*a* with the image-forming plane of the taking lens 13.

In machining the holder-side attaching surface 221, a uniform pattern is projected onto the light-receiving surface 21*a* and the attaching surface 212 is machined by using a cutting tool and/or a grinding tool so that the pattern is evenly projected over the entire area of the light-receiving surface 21*a*. The cutting surface of the cutting tool is set in advance at the position that achievs the distance L3 from the light-receiving surface 21*a*. The distance between the light-receiving surface 21*a* of the image-capturing element 21 and the attaching surface of the holder 22 fluctuates due to the process and the like for packaging and attaching the solid image-capturing element 21 with the holder 22. Accordingly, by machining the attaching surface 212 so as to achieve the distance L3 from the light-receiving surface 21*a*, the entire area of the light-receiving surface 21*a* is aligned with the image-forming plane. Thus, as illustrated in exaggeration in FIG. 1, the attaching surface 212 is made to incline relative to the light-receiving surface 21*a* and the optical axis AX and the position of the image-capturing device 20 fluctuates among individual camera units. Thus, by using the gaskets 25 which undergo elastic deformation as illustrated in FIG. 2, the shield plate 24 can be grounded to the camera rear body 11*b* with a high degree of reliability through the elastic deformation of the gasket 15 even if the shield plate 24 inclines relative to the rear body 11*b* as illustrated in FIG. 1. In addition, because of the elastic deformation, 10 the periphery of the shield plate 24 can be evenly covered.

The following advantages are achieved in the first embodiment described above.

(1) While the shield plate 24 is grounded to the holder 22 via the screws SC3, the electromagnetic wave noise may is not be fully absorbed due to the small grounding capacity of the holder 22. In the first embodiment, the shield plate 24 is pressed by the gaskets 25 comprising a conductive elastic material bonded to the conductive rear body 11*b*. As a result, the flat portion 241 of the shield plate 24 is grounded to the camera body 11 with a large grounding capacity with a high degree of reliability so that the function of electromagnetic wave noise absorption achieved by the shield plate 24 is realized to the full extent.

(2) Since the gap formed between the periphery of the shield plate 24 and the circuit board 23 is filled by the gasket 25, electromagnetic wave noise leaking to the side of the shield plate 24 is absorbed by the gaskets 25, and this, in combination with the advantage (1) described above, achieves an even higher degree of reliability in preventing electromagnetic wave noise leak.

Second Embodiment

Figure 4:
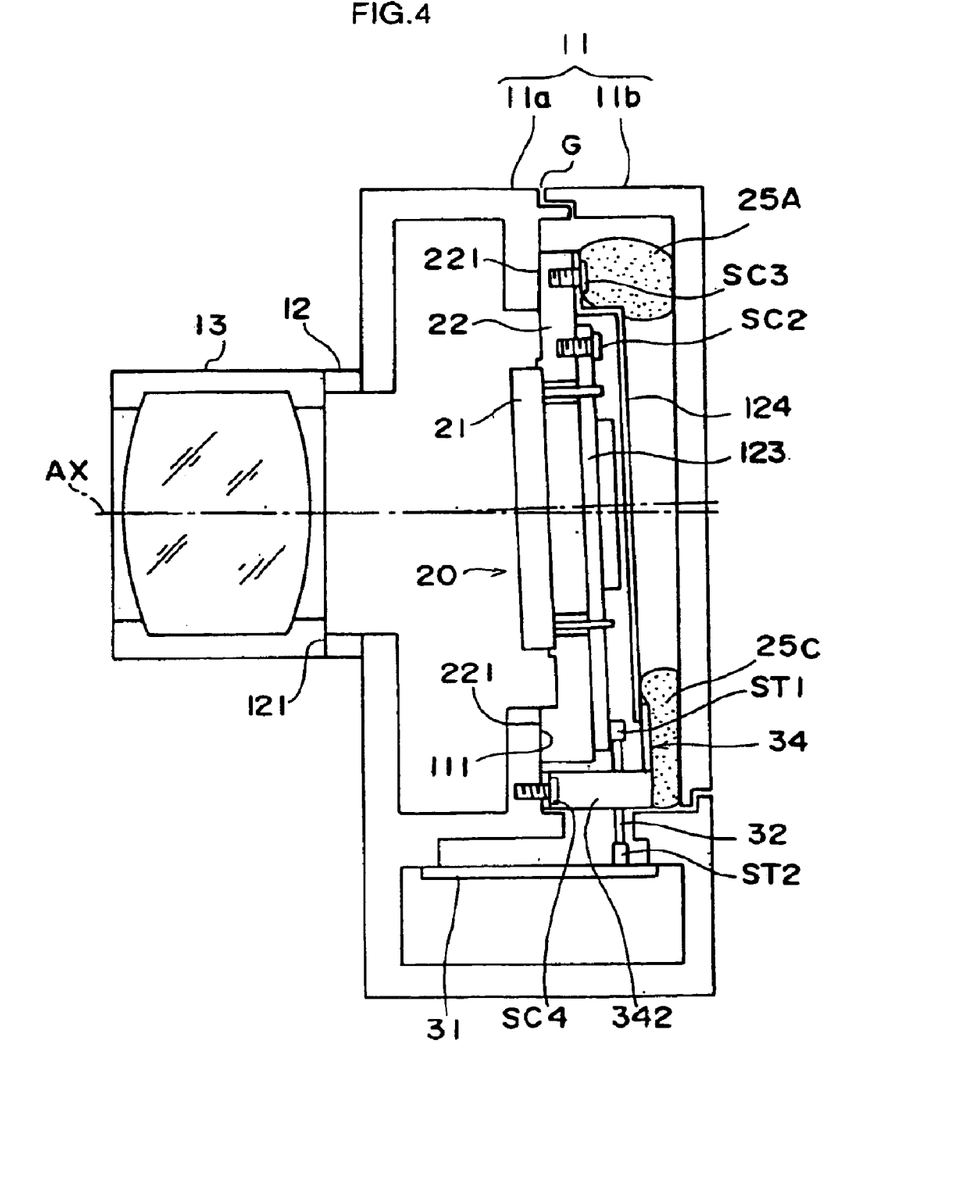
FIG. 4 is a longitudinal vertical cross sectional view schematically illustrating a second embodiment of the electronic still camera according to the present invention.
Figure 5:
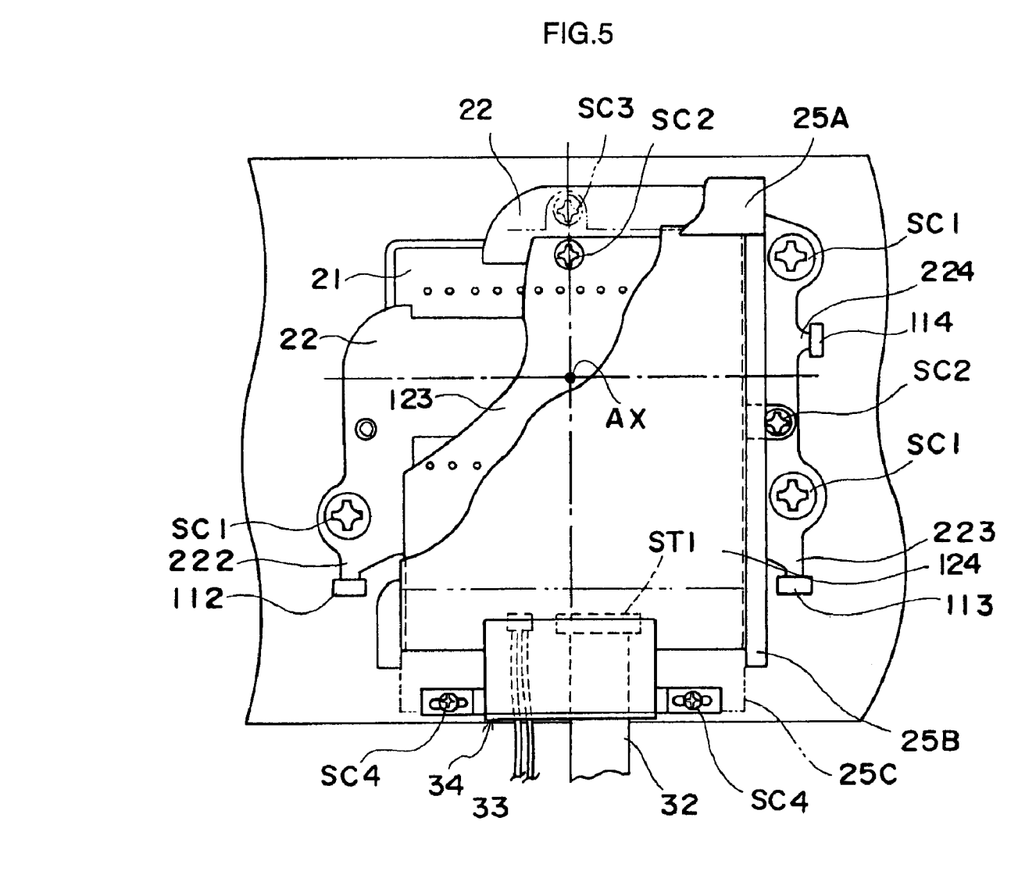
FIG. 5 shows the image-capturing device viewed from the rear side of the camera with the camera rear body s shown in FIG. 4 being removed.
Figure 6:
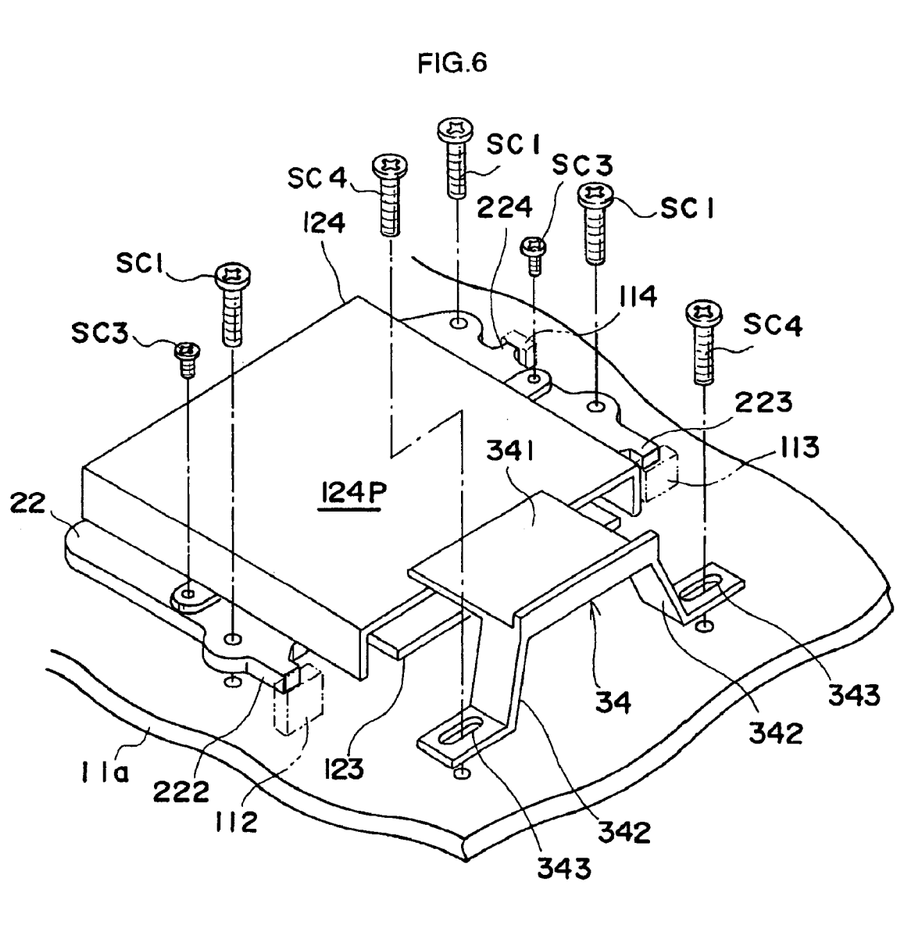
FIG. 6 is a perspective view of the shield plate and the shield member shown in FIG. 4.

The second embodiment of the electronic camera according to the present invention is now explained in reference to FIGS. 4–6. In the first embodiment described above, the bent portions 242*a*–242*d* are provided at the four sides of the shield plate 24 to prevent the electromagnetic wave noise from leaking through the gap between the shield plate 24 and a circuit board 23 at the periphery of the four sides of the shield plate 24. As illustrated in FIGS. 4 and 5, the second embodiment requires a flexible print board 32 or a lead wire 33 to be arranged between a socket ST1 provided at a side of a circuit board 123 toward the bottom of the camera and a socket ST2 provided at a circuit board 31 located in the lower portion of the camera. For this reason, there is no bent portion at the lower side of the shield plate 124. As a result, there is a concern that electromagnetic wave noise may leak through the gap between the lower side of the shield plate 124 and the circuit board 123.

Accordingly, in the second embodiment, a small shield member 34 provided separately from the shield plate 124 is used to suppress electromagnetic wave noise leakage occurring through the lower side of the shield plate 124. As illustrated in FIG. 6, the shield member 34 is provided with a flat portion 341 and leg portions 342. The shield member 34 is screwed in at the camera front body 11*a* with screws SC4 via longitudinal holes 343 at the leg portions 342. As explained earlier, the gaskets 25A–25D are provided between the shield plate 124 and the rear body 11*b*. When the gasket 25C presses against the shield member 34 with the mounting screws SC4 for mounting the shield member 34 loosened, the leg portions 342 move along the horizontal direction to lower the height of the flat portion 341 until the flat portion 341 comes into contact with a flat portion 124P of the shield plate 124 at a specific surface pressure. Thus, the flat portion 341 prevents the electromagnetic wave noise radiated by the flexible print board 32 and the lead wire 34 from leaking toward the rear side of the camera.

In the electronic camera according to the second embodiment structured as described above, even when enough space is secured at the lower side of the shield plate 124 to arrange the flexible print board 32, electromagnetic wave noise which would otherwise leak through this space can be absorbed and cut off by separately providing the shield member 34 that shields this space on the rear side thereof. In addition, electromagnetic wave noise can be prevented from leaking to the outside of the camera by adopting the same structural features as those in the first embodiment in the other areas. Since the gasket 25C is provided astride the flat portion 124P of the shield plate 124 and the flat portion 341 of the shield member 34, the flat portion 341 of the shield member 34 is pressed against the flat portion 124P of the shield plate 124 to attain reliable electrical continuity, resulting in enhancing the electromagnetic wave noise shielding effect.

It is desirable to insert a conductive elastic body like a gaskets 25 between the flat portion 124P of the shield plate 124 and the flat portion 341 of the shield member 34 if a sufficient degree of electrical contact cannot be achieved between them.

It is to be noted that while the camera body 11 is constituted of a conductive metal material, it may be constituted of a non-conductive material such as a reinforced plastic or it may be constituted of a conductive plastic, instead. If the camera body 11 is constituted of a non-conductive material, the surfaces of the internal walls of the camera body should be plated with a conductive metal. Likewise, while the shield plates 24 and 124 and the shield member 34 are each constituted of a conductive metal material, they may be constituted of a material having conductive metal particles or the like dispersed in a non-conductive resin matrix material. If the shield plates 24 and 124 are unduly deformed by the elastic force of the gaskets 25, they may become shorted to the various elements on the circuit boards 23 and 123. It is therefore necessary to ensure that the shield plates 24 and 124 have enough strength to prevent them from becoming unduely deformed by the elastic force of the gaskets 25.

The light-receiving surface 21*a* of the image-capturing device 20 may be aligned with the image-forming plane of the taking lens 13 by holding the holder 22 with a screw type positional adjustment mechanism and thus mechanically adjusting the position of the holder 22.

While no explanation is given above on either an optical finder or an electronic finder, a quick-return mirror may be provided between an exchangeable lens and the image-capturing device as in a single lens reflex camera to reflect a subject light flux at a finder optical system located above the mirror by using the quick-return mirror in a non-photographing state. Alternatively, a liquid crystal display device may be provided at the camera rear side instead of an optical finder.

In addition, while an explanation is given above on an example in which the present invention is adopted in an electronic still camera that allows the taking lens to be exchanged, the present invention may be applied to any of various other types of electronic still cameras such as a camera provided with a taking lens which cannot be replaced. Furthermore, the present invention may be adopted in a similar manner in video cameras and monitor cameras that record dynamic images.

What is claimed is:

1. An electronic camera comprising:
an image-capturing element that receives subject image light entering into a camera body through a taking lens;
a holder that holds said image-capturing element and mounts said image-capturing element in said camera body;
a circuit board mounted with a circuit that drives said image-capturing element;
a shield plate provided to cover said circuit board; and
a conductive elastic body that is clamped and becomes deformed between said shield plate and a conductive portion achieving a large grounding capacity, said conductive elastic body is provided at a periphery of said shield plate to fill a gap formed between said shield plate and said circuit board, wherein:
said camera body includes a front cover and a rear cover; and
said conductive elastic body shields a gap at an area where said front cover and said rear cover are joined from said circuit board.

2. An electronic camera according to claim 1, wherein:
a position of said shield plate in said camera body varies among individual camera units.

3. An electronic camera according to claim 2, wherein:
a body-side mounting surface of said camera body to which said holder is mounted is machined to establish a specific distance from an image-forming plane;
a holder-side attaching surface of said holder that is attached to said body-side mounting surface is machined to establish a specific distance from a light-receiving surface of said image-capturing element; and
when said holder is mounted at said camera body, the light-receiving surface of said image-capturing element is aligned with the image-forming plane.

4. An electronic camera according to claim 1, wherein:
said shield plate has enough strength to prevent said shield plate from becoming unduely deformed by a pressure resulting from deformation of said conductive elastic body.

5. An electronic camera according to claim 1, wherein:
said shield plate is constituted of a metal sheet.

6. An electronic camera comprising:
an image-capturing element that receives subject image light entering into a camera body through a taking lens;
a holder that holds said image-capturing element and mounts said image-capturing element in said camera body;
a circuit board mounted with a circuit that drives said image-capturing element;
a shield plate provided to cover said circuit board; and
a conductive elastic body that is clamped and pressed between said shield plate and a conductive portion of said camera body.

7. An electronic camera according to claim 6, wherein:
a position of said shield plate in said camera body varies among individual camera units.

8. An electronic camera according to claim 7, wherein:
a body-side mounting surface of said camera body at which said holder is mounted is machined to establish a specific distance from an image-forming plane;
a holder-side attaching surface of said holder that is attached to said body-side mounting surface is machined to establish a specific distance from a light-receiving surface of said image-capturing element; and
when said holder is mounted at said camera body, the light-receiving surface of said image-capturing element is aligned with the image-forming plane.

9. An electronic camera according to claim 6, wherein:
said shield plate has enough strength to prevent said shield plate from becoming unduely deformed by a pressure resulting from deformation of said conductive elastic body; and
said conductive elastic body is provided at a periphery of said shield plate to fill a gap between said shield plate and said circuit board.

10. An electronic camera according to claim 9, wherein:
said camera body includes a front cover and a rear cover; and
said conductive elastic body electromagnetically shields a gap at an area where said front cover and said rear cover are joined from said circuit board.

11. An electronic camera comprising:
an image-capturing element that receives subject image light entering into a camera body through a taking lens;
a holder that holds said image-capturing element and mounts said image-capturing element in said camera body;
a circuit board mounted with a circuit that drives said image-capturing element;
a first shield plate having an opening to allow wiring from said circuit board to be drawn around, that is provided to cover said circuit board;
a second shield plate that covers said first shield plate so as to cover said wiring opening; and
a conductive elastic body that is clamped and pressed between said first and second shield plates and a conductive portion of said camera body.

12. An electronic camera according to claim 11, wherein:
said second shield plate is deformed by an elastic force imparted by said conductive elastic body to be in contact with said first shield plate.

13. An electronic camera according to claim 12, wherein:
said conductive elastic body is provided at a periphery of said first shield plate to fill a gap formed between said first shield plate and said circuit board.

14. An electronic camera according to claim 13, wherein:
said camera body includes a front cover and a rear cover; and
said conductive elastic body shields a gap at an area where said front cover and said rear cover are joined from said circuit board.

* * * * *